INVENTORS
**FERBER R. SCHLEIF
GLENN E. MARTIN**
BY
*Ernest S. Cohen
Gersten Sadowsky*
ATTORNEYS

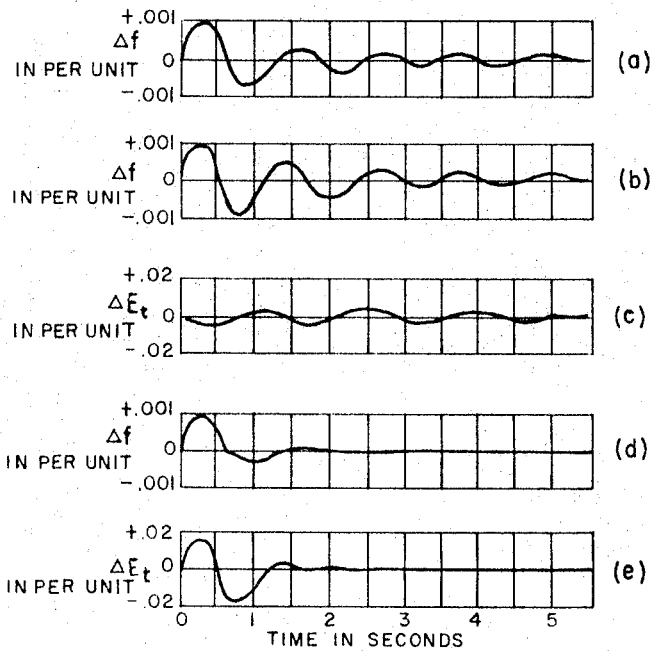
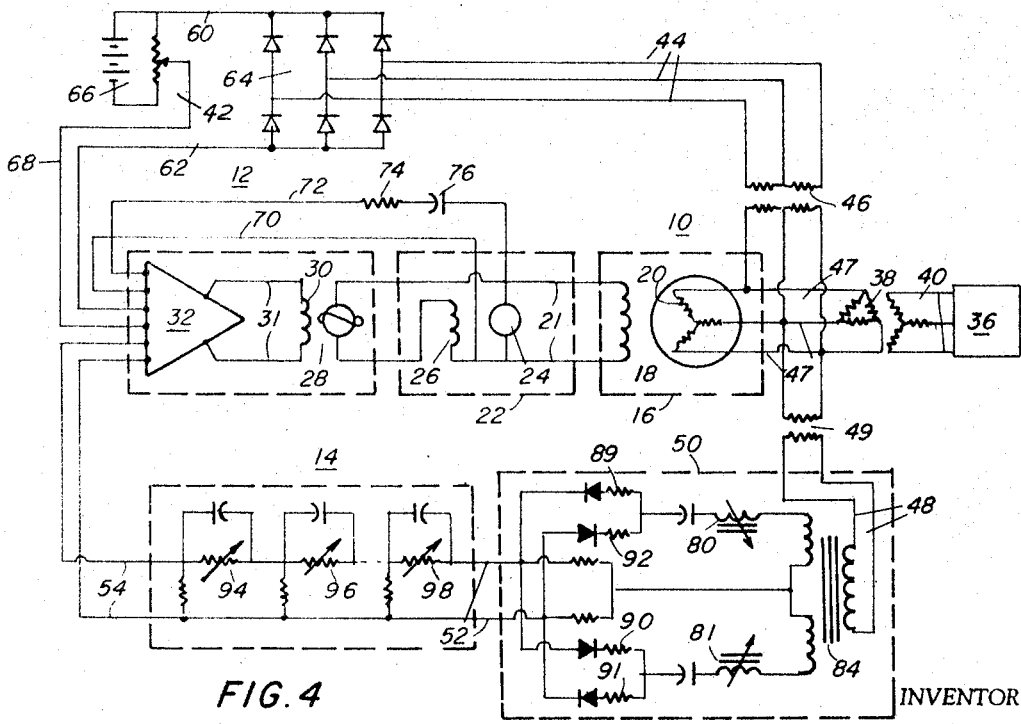

United States Patent Office 3,465,235
Patented Sept. 2, 1969

3,465,235
CONTROL OF ROTATING EXCITERS FOR POWER SYSTEM DAMPING
Ferber R. Schleif, Denver, and Glenn E. Martin, Edgewater, Colo., assignors to the United States of America as represented by the Secretary of the Interior
Filed Oct. 16, 1967, Ser. No. 676,013
Int. Cl. H02k 7/06; H02p 11/04
U.S. Cl. 322—24                           5 Claims

ABSTRACT OF THE DISCLOSURE

Rapid damping of power system swing oscillations is achieved by controlling generator excitation with signals derived in circuits responsive to frequency deviations of terminal voltage so as to direct the terminal voltage into phase with the oscillations characterizing the frequency deviations.

---

Figure 1:
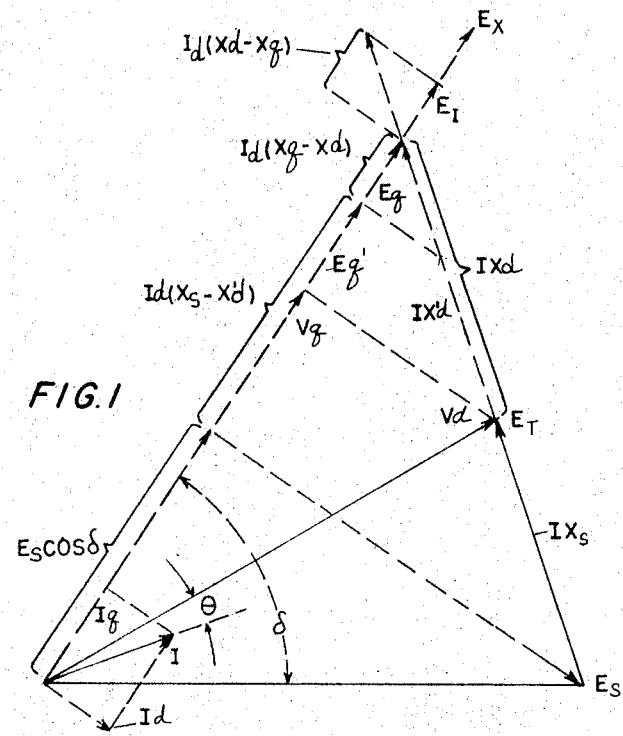

This invention resulted from work done by the Bureau of Reclamation of the U.S. Department of the Interior, and the domestic title to the invention is in the Government.

This invention relates to a method and apparatus for improving the operational stability of power generating systems. More specifically, the invention comprises a damping control procedure and apparatus applicable to electrical power generators having rotating exciters. Voltage regulating arrangements generally associated with electrical generators to maintain their output rating, often contribute to oscillations and instability of the power flow in the system interrelating these generators. In particular, the damping of a power system can be hampered by the response of an excitation system in attempting to maintain constant terminal voltage for the generator it serves. Even though fast control of terminal voltage can help to limit the first swing following a major disturbance, without significant damping the stability of the generator would be lost in subsequent swings or oscillations. The invention is operable to suppress such dislocating contributions and others arising from any cause by producing strong damping of swing oscillations, and consequently increase the transient stability limit of the power generated.

Greatly improved stability is possible using the present invention in which its correction control signal is based on a complex function of speed or frequency. Although a control responsive to nominal speed deviation is effective to damp slow rates of swing, a response to a rate-of-change of speed is required in deriving corrective action to compensate high rates of swing. Where efficient damping at very high swing frequencies is wanted, the second, and sometimes third derivatives of speed may also be needed to achieve the necessary phase correction of the supplementary control signal. The terminal voltage of a power generator remains importantly involved in the present invention since the influence on this voltage by the various excitation controls of the invention in turn influences the damping made effective on the oscillatory system. In essence, this damping is achieved by increasing the load or drag on the oscillating member or rotor of a system generator in a manner to maximize the load during the highest velocity portion of the swing whereat maximum frequency deviations occur. Accordingly, the terminal voltage, which influences the load on the generator, is controlled to reach maximum value when frequency deviation is at its peak. The ultimate effect of applying the greatest load when the frequency deviation is highest is to converge the oscillations sooner since the energy of oscillation is absorbed or damped by a maximum load when the maximum of such energy is present. The terminal voltage is therefore controlled in accordance with a function of frequency or speed deviations, so as to respond in phase therewith whereby requisite generator load compensations can thus be derived for a wide range of swing frequencies, ranging approximately from 10 to 70 cycles per minute, and a high gain in the system is available to provide strong damping of the swings.

It is therefore a primary object of the present invention to provide an improved stability control procedure for the operation of electrical power generator systems which is based on a function of generator speed (or frequency).

A further object of the present invention is to provide improved operational stability control apparatus having a speed or frequency responsive signaling device which functions in conjunction with a phase correction system for the supplementary control signal to compensate for the phase or time lags inherent to the rotating excitation systems of electrical power generators.

Figure 2A:
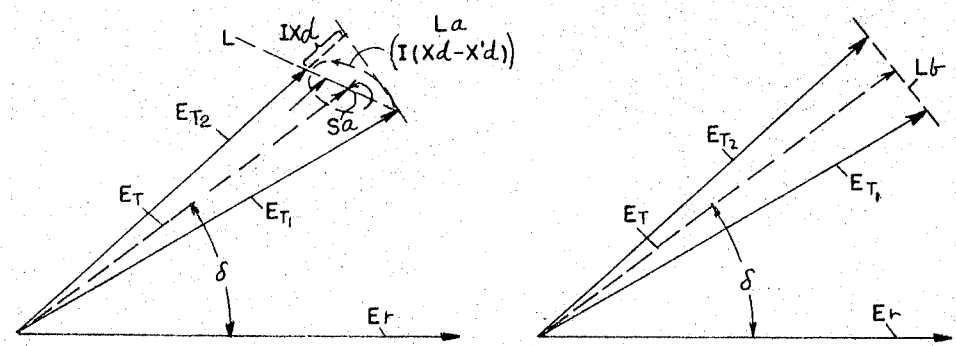
Figure 2B:
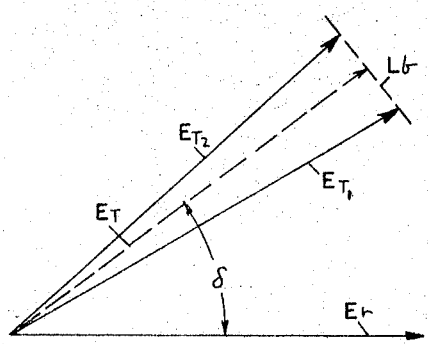
Figure 2C:
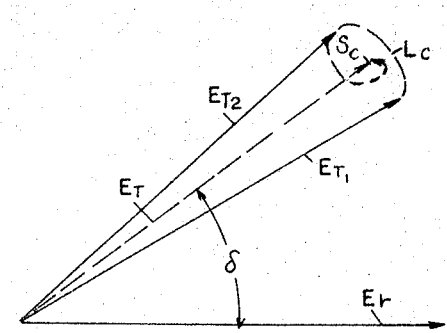

These and other objects and advantages of the invention will become more fully apparent from the following description of a preferred embodiment of the invention when considered together with the accompanying drawing in which FIG. 1 is a phasor diagram of a synchronous electrical generator operation vectorially indicating the pertinent electrical characteristics thereof;

FIGS. 2a, 2b, and 2c are further phasor diagrams which briefly show the varying influences different modes of terminal voltage control have upon the damping characteristics of generator operations;

FIG. 3 presents graphical representations of frequency and terminal voltage deviations as related to time, and in connection with damping procedures indicated in FIGS. 2a, 2b, and 2c; and FIG. 4 is a schematic diagram of an electrical network illustrative of one form of an apparatus embodying the present invention.

Electrical generators are normally equipped with voltage regulators affecting the generator excitation system which rapidly responds thereto for maintaining constant terminal voltage. Since either positive or negative damping can result from such application of this voltage factor, depending upon the relative gain and time constant involved in the generator operation, uniformly reliable damping of system swings is not attainable. Therefore, the invention supplies an additional control input based upon a function of speed deviation which achieves a highly efficient positive damping. Like voltage regulation, the speed control factor influences generator operation through its effect on excitation. However, since the generator speed stability is responsive to change in the power supplied by the generator, the influence of speed upon damping can be determined and made operative upon the prevailing generator load as influenced by the generator terminal voltage. Therefore, since the character of the terminal voltage is dependent upon the degree of excitation, it is evident that speed responsive control is applicable for developing an excitation which produces a terminal voltage providing a power output resulting in particularly effective damping.

The effect of excitation on terminal voltage and consequently on stability and damping is demonstrable by reference to FIG. 1. In this figure are diagrammed the various operational factors of generator function entering into the phasor relationship determinative of the terminal voltage. The solid lines provide a simplified representation of the relationship of terminal voltage $E_T$ and system internal voltage (at infinite bus), $E_s$, and their influence upon load current I through the system reactance $X_s$, to effect power transfer. The dashed lines complete the diagram for the quantities internal to the synchronous machine in which the internal reactances $X_d$, $X'_d$ and $X_q$ are identifiable as generator synchronous reactance, generator transient reactance, and generator quadrature axis reactance, respectively. Voltages $E_q$ and $E'_q$ are identifiable as internal voltages behind synchronous reactance of generator and transient reactance of generator, respectively, and currents $I_d$, and $I_q$ are identifiable as the direct axis component of load current and quadrature axis component of load current. Also indicated in FIG. 1 are power factor angle $\theta$, and the angle $\delta$ between internal voltages. The internal voltage drops $IX_d$, $IX'_d$, $X_d(X_s-X'_d)$, $I_d(X_q-X'_d)$, and $I_d(X_d-X_q)$ serve to relate terminal voltage $E_T$ to the internal voltages $E_I$ and $E_q$.

To permit reference to a simplified expression of tieline power P, which will also be pertinent to the relationships discussed herein, such power is considered as linearly related to electrical phase angle rather than sinusoidally, and further modified in proportion to terminal voltage to constitute the relation $$P = KE_T \frac{Es}{Xs}$$

where K is an operational constant of the generator. The operation thus represented can be considered indicative of small swings around any chosen operating point. However, to fully represent the power to phase relationship, voltages $E_q$ and $E_s$, and the angle $\delta$ must all be considered. Nevertheless for any angle $\delta$ power transfers from $E_q$ to $E_s$, and from $E_T$ to $E_s$ are affected by the magnitude of $E_q$ and $E_T$, respectively. For small deviations around the angle $\delta$, $E_T$ and $E_q$ respond similarly to changes in excitation. Therefore, the influence of the excitation control upon $E_q$ and thence upon $E_T$ extends to regulating the damping of small swings.

Explaining further the generator damping obtained through speed responsive control of terminal voltage, reference is now made to the phasor diagrams of FIGS. 2a, 2b, and 2c. In each of these figures the dashed line phasors $E_T$ represent terminal voltages at steady state after load increase, and angle $\delta$ indicates the angle between the terminal voltage and a phasor quantity $E_r$ representing receiving end voltage at an infinite bus. In FIG. 2a the terminal voltage is represented to be unregulated, and damping derives from a transient lag of the terminal voltage due to the influence of the open circuit field time constant upon the factor $I(X_d-X'_d)$, and a speed to voltage relationship of generator operation. In the transient state it is found that the terminal voltage is retarded in reaching the steady state locus L as terminal voltage swings from $E_{T_1}$, to $E_{T_2}$ by the influence of the field time constant upon armature reaction. As a result, the terminal voltage remains higher than the steady-state locus at $S_a$ during the increasing swing of the phase angle. Accordingly, terminal voltage locus $L_a$ is a diminishing counter-clockwise converging spiral indicating positive damping.

In the event terminal voltage is rigidly and instantaneously regulated to a constant value during swings of power and angle, as indicated in FIG. 2b, the terminal voltage locus $L_b$ is a simple arc of a circle with no spiraling in either direction and there is no contribution, either positive or negative, from the voltage to damping. Thus action of the unmodified voltage regulator may either sacrifice the natural damping inherent with unregulated voltage or may introduce negative damping which would be characterized by a clockwise expanding spiral.

In FIG. 2c is illustrated the much stronger damping obtainable through supplementary control of voltage during transients as a function of speed, such supplementary control being properly compensated for the delays in response of the excitation system.

These effects of regulation upon damping are noticeable in regarding the operational curves shown in FIG. 3. Of the exemplary characteristic curves appearing in the figure, curves (a), (b), and (d) relate frequency deviation $\Delta N$ in per unit to time in seconds, and curves (c) and (e) relate terminal voltage deviation $\Delta E_T$ in per unit to time in seconds. Curve (a) represents generator operation without voltage regulation whereas curve (b) is indicative of operation having normal regulation. Careful inspection of curve (b) clearly evidences less damping than appears in curve (d, which is not unexpected in view of the above discussions distinguishing the non-regulated and regulated generator operations diagrammatically represented in FIG. 2a and FIG. 2b, respectively.

Application of the present invention to regulate generator operation obtains therefor rapid damping of frequency oscillations, or swings around a standard frequency, whereby it counteracts an adverse tendency of rapidly acting voltage regulation for constant terminal voltage, to prolong the frequency deviations associated with tieline load swings. Where the supplementary voltage regulator arrangement provided responds to frequency deviation signals derived from a transducer sensing the frequency of the terminal voltage, it functions to produce a control output fed to the exciter apparatus of the generator. This supplementary control output acts in the exciter apparatus to direct its influence on the generator's rotor or field structure whereby the generator terminal voltage is increased in correspondence with increase in the frequency deviation control signal voltage.

The significant improvement in damping possible through the use of the speed feed-back function according to the present invention is further illustrated in FIG. 3. With normal voltage regulation, curves (b) and (c), it is apparent that voltage deviations lag the frequency deviations by essentially 90°, and corresponds closely with the angular swings (or the integral of frequency deviations) and power flow. As will be hereinafter more fully explained, the detriment attending this lag is effectively obviated by control of generator excitation which advances the phase of the terminal voltage deivations by nearly 90° in response to a supplementary control based on a function of the frequency deviations. To be noted in this connection is that the damping influence of unregulated terminal voltage, and therefore tieline power and its decelerating torque, varies directly with speed, or frequency. Due to the integrating function of inertia upon accelerating torque to obtain speed, the speed lags this torque by 90 degrees of the swing cycle. At the middle of the angular swing, speed and speed deviation would be at their maxima. The unregulated voltage would also be at its maximum. Therefore, the influence of this voltage component upon tieline power reaches its maximum, exerting maximum retarding or damping influence, at the center of the angular swing. As hereinbefore explained, a high-speed voltage regulation action tends to cancel this beneficial influence. However, the aforementioned control in accordance with frequency deviations which advances the terminal voltage, promotes an increase in terminal voltage above normal during increasing angle and below normal during decreasing angle. As shown in FIG. 2c, this phenomenon is characterized by locus $L_c$ of a terminal voltage vector initially increasing from magnitude $E_{T_1}$, during an increasing angular swing and essentially decreasing from magnitude $E_{T_2}$ during a generally decreasing angular swing so as to define a counterclockwise spiral diminishing rapidly to a steady-stage point $S_c$ on the locus. The strong positive damping thus illustrated more than restores the compensatory damping normally accompanying unregulated generator operation. References again to FIG. 3, and particularly its curve (e), makes manifest this ameliorating control in showing terminal voltage deviations corresponding to the frequency deviations indicated by curve (d), as sufficiently advanced to have been changed in sign with respect to curve (c), and nearly in phase with the frequency deviations as shown in curve (b) of the figure. The substantial strengthening of the damping phenomenon gained thereby is easily recognized in a comparison between the rapidly damped form of the frequency deviations curve (d) and the extended oscillations in frequency deviations apparent in curve (b) of FIG. 3.

Turning to the exemplary showing of the present invention in FIG. 4, this invention is seen as a network of electrical circuits in which a power generator arrangement 10 is in operative association with voltage regulating equipment 12, and a supplementary control system 14. Arrangement 10 is represented by a conventional A-C generator 16 wherein a field winding 18 is adapted for rotation by a prime mover with respect to a three phase stator winding 20 from which generated power is drawn. Generator field winding 18 receives voltage on leads 21 connecting this winding to a rotating exciter 22 having a rotor 24 operating in a field winding 26. Voltage regulator 12 is characterized by a power amplifier 28, such as an Amplidyne or other power amplifier, in which an input 30 is connected to receive a control input on leads 31 from a summing amplifier 32. A suitable alternative for rotating device 28 is a static amplifier. Rectangle 36 indicates a remote load or a power system to which generator 16 supplies power by way of a three phase power transformer 38 and transmission lines 40. A proportionate representation of generator output is supplied to a voltage comparator arrangement 42 of voltage regulator 12, by way of leads 44 and a potential transformer 46 connected across generator leads 47. In addition, power taken across one phase of generator 20 is supplied on leads 48 and by way of an isolating power transformer 49 to a frequency responsive transducer 50 which derives a measurement of the generator frequency in terms of frequency deviation signals transmitted by leads 52 to supplementary control system 14. In response to this frequency representation system 14 produces phase correction of the control signals pertinent herein, which are fed on leads 54 to the voltage regulator summing amplifier 32. The phase correction introduced in system 14, an important part of this invention, is such as to compensate for the lag in response of the exciter system at any swing frequency in the range where damping is needed.

Regular operation of the FIG. 4 circuitry wherein A-C generator 16 supplies power on lines 40 to load 36, also finds representations of such voltage fed to line 44 and 48 by way of lines 47. A continuing measurement of generator terminal voltage is applied as via lines 44 and rectifiers 64 a direct current voltage across leads 60 and 62 of comparator 42. A potentiometer circuit 66 connected between lead 60 and a lead 68, is adjustable to provide a predetermined direct current reference voltage opposing the terminal voltage measurement voltage. The difference between the voltages in comparator 42 constitutes an error voltage which is received in summing amplifier 32 by way of lines 62 and 68. Summing amplifier 32 adds this error voltage and the supplementary control voltage supplied therein on leads 54, together with a further voltage derived in an anti-hunt circuit including leads 70 and 72 series connecting a resistor 74, and a capacitor 76, from the exciter rotor 24 to the amplifier. The anti-hunt circuit operates in a conventional manner to avoid overcorrection by supplying a voltage defined in the reactance elements thereof in response to the exciter output, to oppose the error voltage in summing amplifier 32.

The operation of frequency transducer 50 as an example is dependent on two series resonant LC circuits 80 and 81, each of which is tuned to a different frequency such that one circuit is tuned above and one below the nominal frequency of the terminal voltage, for example 60 cycles. An input transformer 84 having its primary energized by the single phase output on lines 48, provides corresponding represetative voltages from each of its two secondaries. However, since the resonant circuits are set to different frequencies, they present a different impedance to the voltage across them, and a different A-C current flows in each. A fully rectified direct current potential representing frequency deviation is provided across output leads 52 to supplementary control system 14 by way of series connected arrangements of rectifiers 89, 90, and 91, 92. Control system 14 includes a sequence of reactance circuits 94, 96, 98 which are individually settable to define a phase control function in the signal passing therethrough between leads 52 and 54. The phase correction network 14, schematically represented in FIG. 4, in practical application can contain operational amplifiers to avoid interaction between stages and to simplify adjustment. Nevertheless, the transfer function of the network is to be so constituted as to supply phase advance at any frequency of system swing which compensates the lag of the excitation system behind the supplementary signal at that swing frequency. As was previously indicated, this phase control function signal is supplied to the summing amplifier 32 where in conjunction with the voltage regulation and anti-hunt signals in the amplifier, it determines a phase and magnitude control for the terminal voltage which secures optimum damping for the generator.

While preferred forms of the method and physical embodiment of the invention have been illustrated and described herein, it is understood that the invention is not limited thereby, but is susceptible to change in form and detail.

What is claimed is:

1. A method for damping swing frequency oscillations of electrical power generating systems wherein exciter controlled generators having rotors are operable in connection with the appertaining procedure which includes terminal voltage regulation of each said generator of the system by the steps of sensing said terminal voltage, and deriving first and second voltages corresponding thereto, deriving an error control signal voltage in response to a comparison between said first corresponding voltage and a reference voltage representative of the desired terminal voltage of said generating system, deriving a further supplementary control signal from said second corresponding voltage representative of frequency deviation of said terminal voltage from the rated frequency of said generating system, modifying said further supplementary control signal in accordance with a function whose terms characterize a phase advance of the terminal voltage swing with respect to the phase of recurring variations in frequency deviations to substantially match said phases, and applying a summation of said error control signal and modified further control signal voltages to said exciter control of said generator whereby power delivery from said generator is varied as required to oppose the advance or retardation of said generator rotor as to rapidly damp said frequency oscillations around said swing.

2. An appaaratus for damping swing frequency oscillations of electrical power generating systems comprising exciter controlled generators having rotors, voltage regulating circuitry for each said generator including a voltage comparison circuit comprising a reference voltage source, a frequency transducer circuit producing a signal voltage output representative of freqency deviations about a predetermined freqency, electrical connections between said generator and said comparison and transducer circuits transmitting representations of a terminal voltage output from said generator, said comparison and transducer circuits responding to receipt of said generator output representations to produce first and second signal voltages respectively representing the difference between said output and a reference voltage, and frequency deviation from a rated frequency in said generator output, adjustable means responsive to an input thereto of said second signal voltage to produce a further signal voltage representing a quantity controlling a phase shift of said terminal voltage with respect to the phase of said frequency deviations, a summing amplifier connected to receive as inputs thereto said first signal voltage and said further signal voltage and produce an output transmitted to said exciter of said generator which effectuates rapid damping of generator swing oscillations.

3. The generator damping apparatus of claim 2, wherein said comparison circuit includes connections transmitting thereto a three-phase output voltage representative of said generator terminal voltage, means rectifying and supplying said output representation in comparison circuitry energized from said reference voltage source whereby said first signal voltage represents the difference between said reference and rectified representation voltages.

4. The generator damping apparatus of claim 2 wherein an exciter control for said generator includes a rotor driven with respect to a field winding connected for energization in a circuit comprising a further amplifier receiving the output of said summing amplifier, further circuitry connected across said rotor and supplying a still further signal voltage to said summing amplifier, said circuitry comprising capacitance-resistance elements which determine said still further signal voltage to avoid overcorrection of said generator by said exciter.

5. An apparatus for damping swing frequency oscillations of electrical power generating systems including generators having rotors and excitation means connected thereto, a stability correction network associated with each generator, said network comprising a control arrangement for said excitation means, said arrangement including a summing amplifier and a rotating amplifier energized thereby for supplying a control voltage to said generator rotor, a voltage regulating circuit receiving a terminal voltage input from said generator and producing an error signal voltage indicative of the difference between said terminal voltage and a reference voltage, a supplementary control system circuitry receiving a voltage representing frequency deviations from the rated frequency of said generator and producing a signal voltage so advanced in phase as to produce variations of terminal voltage in phase with frequency or speed deviations, and circuit means transmitting said error and phase shift control voltages to said summing amplifier.

References Cited
UNITED STATES PATENTS

| | | | |
|---|---|---|---|
| 2,524,166 | 10/1950 | Gartner | 322—24 |
| 2,764,729 | 9/1956 | Israel | 322—24 |
| 2,966,625 | 12/1960 | Kelley | 322—24 |
| 3,242,353 | 3/1966 | Bristol et al. | 322—24 X |

ORIS L. RADER, Primary Examiner

H. HUBERFELD, Assistant Examiner

U.S. Cl. X.R.

322—28, 32